C. F. WASSERFALLEN.
TIRE RIM LOCK.
APPLICATION FILED OCT. 29, 1917.
1,425,817.
Patented Aug. 15, 1922.
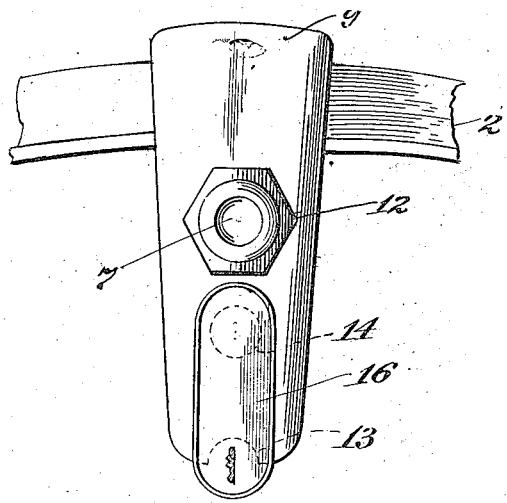
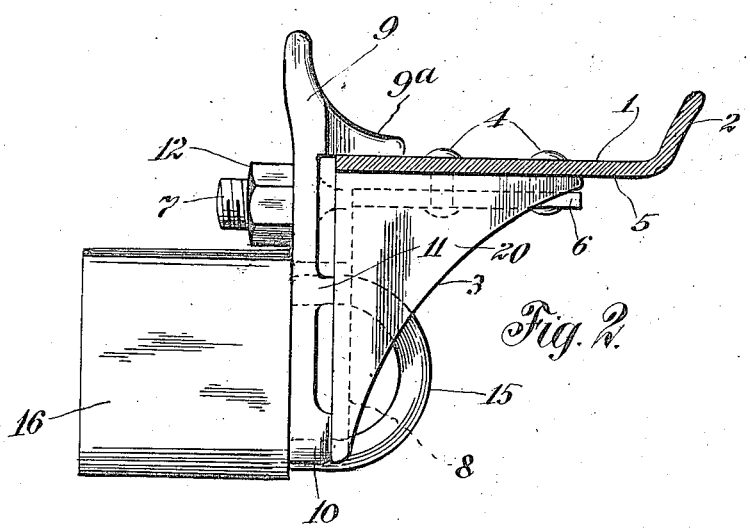
Witness
Charles Balg
Chas. W. Stauffiger
Inventor
Charles F. Wasserfallen
By Barthel & Barthel
Attorneys

UNITED STATES PATENT OFFICE.

CHARLES F. WASSERFALLEN, OF DETROIT, MICHIGAN, ASSIGNOR TO DETROIT TIRE CARRIER CO., OF DETROIT, MICHIGAN, A CORPORATION OF MICHIGAN.

TIRE-RIM LOCK.

1,425,817.  Specification of Letters Patent.  Patented Aug. 15, 1922.

Application filed October 29, 1917. Serial No. 199,151.

*To all whom it may concern:*

Be it known that I, CHARLES F. WASSERFALLEN, a citizen of the United States of America, residing at Detroit, in the county of Wayne and State of Michigan, have invented certain new and useful Improvements in Tire-Rim Locks, of which the following is a specification, reference being had therein to the accompanying drawings.

This invention relates to a locking clamp for spare rim supporters and to an arrangement thereof whereby applied rims or tires are held on the device without danger of the tires being surreptitiously removed.

The invention consists in the matters hereinafter set forth and more particularly pointed out in the appended claims.

In the drawings,

Figure 1 is a view in elevation of a device embodying features of the invention;

Fig. 2 is a view taken at right angles to Fig. 1, partially in section and partially in elevation.

As herein shown in preferred form, a ring 1 has an inner flange 2 and is otherwise supported and arranged on the back or side of a vehicle for carrying a spare tire or the like. A clamping device is adapted to cooperate with the flange 2 to retain the tire thereon and said ring is provided with one or more angle brackets 20 having brace flanges 3. A pair of rivets 4 or other holding means secure the brackets against the inner peripheral face 5 of the ring 1. These holding members are likewise secured to the flattened shank 6 of a threaded stud 7, which passes through an aperture in the depending web 8 of the bracket. A clamping member 9, the lower portion of which carries a lug 10 which may abut against the outer face of the web member 8 of the outer bracket, has an upper portion that overlies the rim 1 and cooperates with the flange 2 to maintain an applied spare rim in position on the ring 1.

A block 11 intermediate the ends of member 9 is adapted to abut against the face of web 8, and since the upper portion of member 9 does not contact with such face, block 11 may form a fulcrum for the member when the latter is positioned through the action of a nut 12 on stud 7. Where the spare rim is of a size such as to prevent contact of block 11 with the web face, lug 10 may serve as the fulcrum; it may occur that both lug and block may be in contact with the web face under such conditions. Either of these conditions may be present in use, it being understood that the toe 9ª of member 9 enters beneath the rim located on ring 1, the inward movement of the toe serving to clamp the rim in position on the holder by not only forcing contact of the rim with flange 2 but with that portion of the holder on the opposite side of the rim from the toe where the rim is brought into contact with the holder. The length of movement of member 9 thus may be of different lengths in producing this result dependent upon the rim being positioned. And in this connection the presence of both lug 10 and block 11 becomes of advantage since the possibility of shift of fulcrum enables the necessary length of movement without requiring adjustment through a comparatively large angle and hence the member need not project a large distance from the web face, the shift in fulcrum from lug 10 to block 11 permitting the lower end of the member to move outwardly to compensate for such length of movement as would require a large range.

The unit carries means to enable locking the member 9 against removal, web 8 and member 9 being provided with alined openings or recesses which permit of the passage of the shackle or other element of a locking device such, for instance, as a padlock. In the drawings, the member 9 carries a notch 13 at its lower end and an aperture 14 at an intermediate point, web 8 being suitably apertured and notched to correspond. By utilizing notches the size of the shackle may vary within limits without affecting the locking action.

As will be understood, the presence of the lock, indicated at 16, with its shackle 15, prevents removal of member 9, so that the rim is prevented from being surreptitiously removed, the adjustment of nut 12 acting as a means to clamp the rim to prevent rattling, etc.

Consequently, any rim applied to the holding device 1, which may be of any preferred type, is securely held in position and its loss by stealing prevented. The device does not add materially to the weight of the spare rim holder itself and does not detract from the appearance of the holder.

Obviously, changes in the details of construction may be made without departing from the spirit of my invention and I do not care to limit myself to any particular form or arrangement of parts.

What I claim is:—

1. As a means for retaining a spare tire rim in position on a spare tire carrier structure, and wherein the rim is supported on a rim holder, a unit comprising an element permanently secured to the holder, a member removably supported by said element and having a face adapted to engage the rim to clamp it in position, and removable means whereby the member will be retained in position, said means including a member carried by and adjustable relatively to the element and operative in producing the clamping action, said element and member having alined openings to permit of the passage of an element of a removable locking device with the openings so arranged that the positioned locking device will retain the member in position regardless of releasing movement of the removable means.

2. Means as in claim 1 characterized in that the openings of the member and element are spaced apart for the passage of the shackle of a padlock.

3. Means as in claim 1 characterized in that the openings of the member and element are spaced apart for the passage of the shackle of a padlock, with one of the sets of openings elongated to permit of the use of locks differing in size.

4. The combination with the ring of a spare tire carrier, of means for retaining a spare tire rim thereon, said means including an element permanently secured to the interior of the ring and having a threaded portion projecting beyond a face of the element, a removable member positionable on said threaded portion and adapted to fulcrum on said face, said member having a face adapted to engage the tire rim to clamp it to the ring, and a nut threaded to said threaded portion and operative on the member beyond the fulcrum in producing the clamping action, said element and member having alined openings to permit passage of an element of a removable locking device with the openings so arranged that the positioned locking device will retain the member in position regardless of releasing movement of the nut.

5. A unit of the type of claim 4 characterized in that the member carries two spaced apart fulcrum portions either of which may form the fulcrum for the member when in clamping position.

6. In means for clamping tire rims in position, a permanently-positioned bracket having a face extending angularly to the positioned rim, a removable rim clamping member having a pair of spaced-apart portions either of which may abut said face to form a fulcrum member therewith during the clamping operation, and means for moving the member to its clamping position, said means being positioned beyond the fulcrum zone.

7. Means as in claim 6 characterized in that the bracket and member are provided with alined openings for the passage of an element of a removable locking device, the position of said openings locating the locking device at the fulcrum zone.

In testimony whereof I affix my signature in the presence of two witnesses.

CHARLES F. WASSERFALLEN.

Witnesses:
ANNA M. DORR,
CHAS. W. STAUFFIGER.